United States Patent
Xiong

(10) Patent No.: US 10,743,382 B1
(45) Date of Patent: Aug. 11, 2020

(54) CLOSED LOOP FREQUENCY CONTROL METHOD FOR A SELF-OSCILLATING CIRCUIT

(71) Applicant: UNIVERSAL LIGHTING TECHNOLOGIES, INC., Madison, AL (US)

(72) Inventor: Wei Xiong, Madison, AL (US)

(73) Assignee: Universal Lighting Technologies, Inc., Madison, AL (US)

( * ) Notice: Subject to any disclaimer, the term of this patent is extended or adjusted under 35 U.S.C. 154(b) by 0 days.

(21) Appl. No.: 16/696,885

(22) Filed: Nov. 26, 2019

Related U.S. Application Data

(60) Provisional application No. 62/832,351, filed on Apr. 11, 2019.

(51) Int. Cl.
| | |
|---|---|
| *H05B 37/02* | (2006.01) |
| *G05F 1/00* | (2006.01) |
| *H05B 45/305* | (2020.01) |
| *H05B 45/382* | (2020.01) |

(52) U.S. Cl.
CPC ......... *H05B 45/305* (2020.01); *H05B 45/382* (2020.01)

(58) Field of Classification Search
CPC ............ H05B 33/0815; H05B 33/0818; H05B 41/2828; H05B 41/3921; H05B 41/3927; H05B 41/28; H05B 37/029; H05B 33/0803; H05B 37/0254; H05B 37/02; H02M 3/33523; H02M 2001/0032; H02M 3/33507; H02M 3/33561; H02M 3/33569; H02M 3/33546; H02M 1/36; H02M 2001/0025; H02M 1/32; Y02B 70/16
See application file for complete search history.

(56) References Cited

U.S. PATENT DOCUMENTS

| | | | |
|---|---|---|---|
| 5,696,431 A | 12/1997 | Giannopoulos et al. | |
| 5,864,472 A * | 1/1999 | Peterson | H02M 3/3387 363/18 |
| 9,112,415 B2 | 8/2015 | Grakist et al. | |
| 9,237,613 B1 | 1/2016 | Xiong et al. | |
| 9,837,913 B1 * | 12/2017 | Xiong | H02M 3/3376 |
| 10,098,194 B1 | 10/2018 | Xiong | |
| 2004/0160794 A1* | 8/2004 | Lin | H02M 7/523 363/98 |

(Continued)

OTHER PUBLICATIONS

International Rectifier: IRS27951S/IRS27952(4)S Resonant Half-Bridge Converter Control IC data sheet, Aug. 27, 2015.

*Primary Examiner* — Minh D A
(74) *Attorney, Agent, or Firm* — Patterson Intellectual Property Law, P.C.; Gary L. Montle; Alex H. Huffstutter

(57) ABSTRACT

A resonant power converter and method for limiting the output power using a voltage sensing circuit across the output is provided herein. The voltage sensing circuit feeds a sensed voltage back to a feedback circuit which produces an error voltage based on the difference between the sensed voltage and a reference voltage. The error signal is fed back to a current control circuit to dynamically adjust the operating frequency and maintains a constant output voltage. The current control circuit accurately sets the minimum and maximum operating frequencies of a self-oscillating integrated circuit. By accurately setting the minimum frequency, a maximum output power of the converter can be controlled.

15 Claims, 4 Drawing Sheets

(56) References Cited

U.S. PATENT DOCUMENTS

| | | |
|---|---|---|
| 2013/0099788 A1* | 4/2013 | Xu .................... G01R 33/3852 324/322 |
| 2013/0271021 A1 | 10/2013 | Elferich |
| 2014/0091720 A1 | 4/2014 | Brinlee |
| 2015/0103562 A1 | 4/2015 | Yeh et al. |
| 2015/0257222 A1 | 9/2015 | Siessegger et al. |
| 2016/0014858 A1 | 1/2016 | Ramabhadran et al. |
| 2016/0073457 A1 | 3/2016 | Nakajo |
| 2016/0190945 A1 | 6/2016 | Liu et al. |
| 2017/0093296 A1 | 3/2017 | Chen |
| 2017/0187298 A1 | 6/2017 | Lin |
| 2017/0222565 A1 | 8/2017 | Sonobe |
| 2018/0262118 A1 | 9/2018 | Ouyang |

* cited by examiner

CLOSED LOOP FREQUENCY CONTROL METHOD FOR A SELF-OSCILLATING CIRCUIT

CROSS-REFERENCES TO RELATED APPLICATIONS

This application claims benefit under 35 USC. § 119(e) of U.S. Provisional Patent Application No. 62/832,351, filed Apr. 11, 2019, entitled "Close Loop Frequency Control Method for Self-Oscillating Circuit."

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

FIELD OF THE INVENTION

The present disclosure relates generally to power supplies that provide a DC voltage to a load, such as, for example, light-emitting diodes. More particularly, the present disclosure relates to an apparatus and method for sensing voltage through the load to provide feedback to the power supply to enable the power supply to maintain a substantially constant voltage through the load.

BACKGROUND

Light emitting diodes (LEDs) provide light in response to receiving a DC current (assuming proper bias) and in proportion to the received DC current. Resistance of an LED light source fluctuates. Therefore, constant current driver circuits are preferred with LED based light sources. Underwriters Laboratories (UL) class II standards for LED driver circuits require certain criteria to pass regulation, including for example that the driver circuit have an isolated output, pass a short circuit test, provide a controlled (i.e., limited) output voltage, and provide a constant current. Of particular importance to the present disclosure is a requirement that at any time the output power cannot be more than 100 watts. A DC-to-DC power converter is one example of a constant output voltage driver that can be configured to control the power output, for example by controlling the output current and voltage at the same time in order to make sure the output power is less than 100 watts at any time.

In an illustrative example, a DC-to-DC converter drives a DC load such as, for example, one or more light-emitting diodes (LEDs). The converter includes a DC-to-AC inverter in a primary circuit. The inverter generates a switched AC voltage, which is applied to the primary winding of an isolation transformer. A secondary winding of the isolation transformer provides an input to an AC-to-DC rectifier in a secondary circuit. The rectifier produces a DC voltage, which is applied to the load. The magnitude of a current flowing through the load is sensed and compared to a reference magnitude. Additionally, the magnitude of a voltage across the load is sensed and compared to a reference magnitude. A first operational amplifier or other comparator in the secondary circuit generates a current feedback signal in response to a difference between the sensed current magnitude and the reference magnitude. A second operational amplifier or other comparator in the secondary circuit generates a voltage feedback signal in response to a difference between the sensed voltage magnitude and the reference magnitude. The feedback signals are fed to a current control circuit to regulate a frequency control current flowing from a control terminal of a switch controller integrated circuit in the DC-to-AC inverter. The switch controller is responsive to the frequency control current to vary the frequency of the switched AC voltage. Varying the frequency of the AC voltage varies the magnitude of the load current to control the output power to be, for example, less than 100 watts.

An issue with controlling the output power by monitoring both the load current and the load voltage is that if the maximum load current is high, for example, greater than 5 amperes, then sensing the current will be very lossy. Accordingly, a special current sensing resistor would have to be used for circuits which produce such a high current. The special current sensing resistor can be very costly.

Additionally, the current feedback signal has to be integrated with voltage feedback signal to generate the frequency control current in the current control circuit, which can be very complicated.

BRIEF SUMMARY

Accordingly, a need exists for improvements to the DC-to-DC converter to control the maximum power in a different and more efficient way, and which simplify the design and reduce the costs of producing the circuit.

One embodiment of a resonant power converter as disclosed herein comprises first and second switching elements coupled across a direct current (DC) power source, and a resonant circuit coupled between an isolation transformer primary winding and an output node between the first and second switching elements. A voltage sensing circuit is coupled to a secondary winding of the isolation transformer and configured to provide a sensor output signal representative of an output voltage across a load. A feedback circuit is configured to generate an error signal responsive to a difference between the sensor output signal and a reference signal. A controller comprising a frequency control input terminal is provided, and further configured to generate drive signals to the first and second switching elements at a determined operating frequency. A current control circuit is coupled between the feedback circuit and the frequency control input terminal of the controller, and configured to apply a first resistance between the frequency control input terminal and a primary side ground, thereby defining a minimum operating frequency associated with a maximum output current to the load. The controller is further configured to regulate the operating frequency of the first and second switching elements above the minimum operating frequency based at least on the error signal.

In one exemplary aspect of the aforementioned embodiment, the minimum operating frequency may be greater than a resonant frequency of the resonant power converter.

In another exemplary aspect of the aforementioned embodiment, the current control circuit may be configured to apply a second resistance between the frequency control input terminal and the primary side ground, the combination of the first resistance and the second resistance thereby defining a maximum operating frequency associated with a minimum output current to the load. The controller may further be configured to regulate the operating frequency of the first and second switching elements between the maximum and minimum operating frequencies based at least on the error signal.

In another exemplary aspect of the aforementioned embodiment, the second resistance may include a first diode having an anode of the first diode coupled to the frequency control input terminal, and the second resistance may further include first and second resistors coupled in series between a cathode of the first diode and the primary side ground.

In another exemplary aspect of the aforementioned embodiment, the minimum operating frequency may be defined when the first diode is reverse biased.

In another exemplary aspect of the aforementioned embodiment, the current control circuit may include an optocoupler having an input stage and an output stage. The input stage is coupled to receive the error signal, and the output stage includes a variable impedance between a first output terminal and a second output terminal responsive to the error signal. A second diode is coupled between the second output terminal and a node defined between the first and second resistors of the second resistance.

In another exemplary aspect of the aforementioned embodiment, the maximum operating frequency may be defined when the second diode is reverse biased.

In another exemplary aspect of the aforementioned embodiment, the error signal of the feedback circuit may increase when the sensor output signal is greater than the reference signal, and the error signal of the feedback circuit may decrease when the sensor output signal is less than the reference signal.

In another exemplary aspect of the aforementioned embodiment, the controller may adjust the operating frequency of the first and second switching elements, at least for maintaining a substantially constant output voltage across the load when a resistance of the load changes.

In another exemplary aspect of the aforementioned embodiment, the operating frequency of the controller may be directly proportional to a current output of the frequency control input terminal, and the frequency control input terminal may be coupled to the reference signal.

DETAILED DESCRIPTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

The following detailed description of embodiments of the present disclosure refers to one or more drawings. Each drawing is provided by way of explanation of the present disclosure and is not a limitation. Those skilled in the art will understand that various modifications and variations can be made to the teachings of the present disclosure without departing from the scope of the disclosure. For instance, features illustrated or described as part of one embodiment can be used with another embodiment to yield a still further embodiment.

The present disclosure is intended to cover such modifications and variations as come within the scope of the appended claims and their equivalents. Other objects, features, and aspects of the present disclosure are disclosed in the following detailed description. One of ordinary skill in the art will understand that the present discussion is a description of exemplary embodiments only and is not intended as limiting the broader aspects of the present disclosure.

Figure 1:
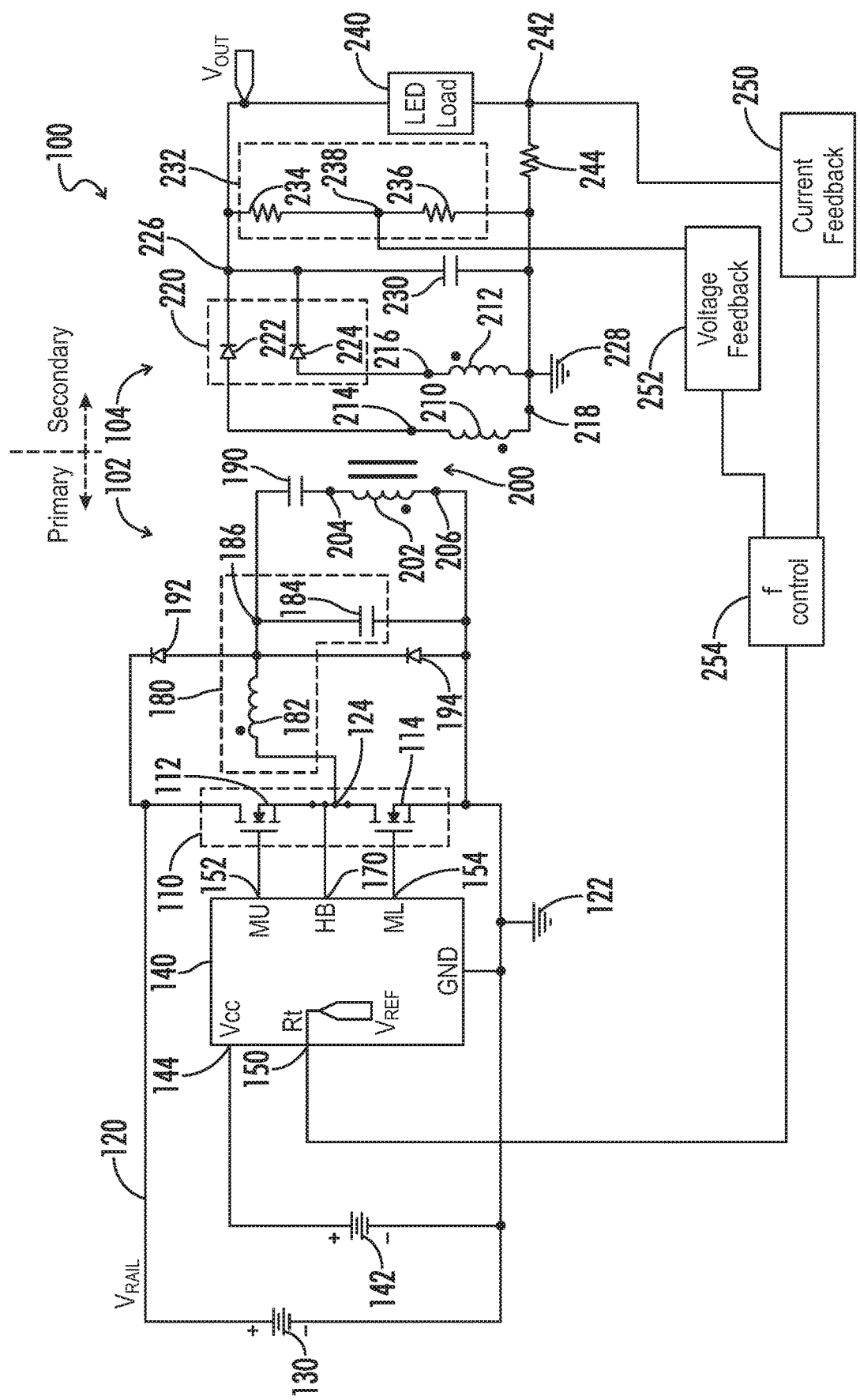
FIG. 1 is a circuit diagram representing an embodiment of a half-bridge resonant type DC-DC converter as disclosed herein.

FIG. 1 illustrates an embodiment of a half-bridge resonant type DC-DC converter 100, which provides a constant output voltage to a load. As used herein the constant output voltage is referenced to a reference magnitude. The reference magnitude may be varied, and the constant output voltage will track the reference magnitude. The illustrated converter operates over a wide range of output load currents and is stable over the range of load currents. The converter is configured to regulate the voltage and current supplied to the load in order to maintain the output power at no more than 100 watts. Accordingly, the current and voltage must be controlled at the same time.

The exemplary converter 100 includes a primary circuit 102 and a secondary circuit 104, which are electrically isolated as described below. The converter includes a first switch 112 and a second switch 114 in a half-bridge switching circuit 110. The switches may be, for example, metal oxide semiconductor field effect transistors (MOSFETs) or bipolar junction transistors (BJT's). In the illustrated embodiment, the two switches are n-channel MOSFETs. The half-bridge switching circuit is connected between a DC input bus 120 (also labeled as $V_{RAIL}$) and a primary circuit ground reference 122. The DC input bus may be considered as a first voltage rail; and the primary circuit ground reference may be considered as a second voltage rail. The drain of the first switch is connected to the DC input bus. The source of the first switch is connected to the drain of the second switch at a common switched node 124 of the half-bridge switching circuit. The source of the second switch is connected to the primary circuit ground reference.

In the illustrated embodiment, the voltage on the DC input bus 120 is provided by a first DC voltage source 130. In the illustrated embodiment, the first DC voltage source is illustrated as a battery; however, it should be understood that the voltage on the DC input bus may be provided by other sources, such as, for example, a power factor correction (PFC) stage, the DC output of a bridge rectifier, or the like, which are supplied from an AC source (not shown). The battery is representative of a variety of voltage sources that provide a substantially constant voltage on the DC input bus.

Each of the first switch 112 and the second switch 114 has a respective control input terminal. In the illustrated embodiment incorporating MOSFETs, the control input terminals are the gates of the two transistors. The control input terminals are driven by a self-oscillating half-bridge gate driver integrated circuit (IC) 140, which may also be referred to as a switch controller. In the illustrated embodiment, the driver IC (switch controller) may be, for example, an NCP1392B high-voltage half-bridge driver with inbuilt oscillator, which is commercially available from ON Semiconductor Company of Phoenix, Ariz. The driver IC is powered by a second DC voltage source 142 via a $V_{CC}$ input pin 144. In FIG. 1, the second DC voltage source is illustrated as a battery that provides a voltage $V_{CC}$; however, it should be understood that the second DC voltage source may also be derived from an AC source.

The driver IC (switch controller) 140 is responsive to a timing resistance connected to a timing terminal (RT) 150 to alternately apply an upper drive voltage on an upper drive terminal (MU) 152 and apply a lower drive voltage to a lower drive terminal (ML) 154. The upper output drive voltage is applied to the control input terminal of the first switch 112. The lower output drive voltage is applied to the control input terminal of the second switch 114. When the resistance applied to the timing terminal of the driver IC increases, the current flowing out of the timing terminal decreases, which causes the frequency of the drive voltages applied to the two switches to decrease. When the resistance applied to the timing terminal of the driver IC decreases, the current flowing out of the timing terminal increases, which causes the frequency of the drive voltages to increase. The driver IC may include other terminals that are not shown in FIG. 1.

The common switched node 124 of the half-bridge switching circuit 110 is connected to a half bridge connection terminal (HB) 170 of the driver IC 140. The common switched node is also connected to a first terminal of a resonant inductor 182 in a resonant circuit 180. A second terminal of the resonant inductor is connected to a first terminal of a resonant capacitor 184 at an output node 186 in the resonant circuit. A second terminal of the resonant capacitor is connected to the primary circuit ground reference 122. The resonant inductor and the resonant capacitor are the main resonant components of the resonant circuit, which is driven by the alternatingly connecting the common switched node to the DC bus 120 via the first switch 112 and to the primary circuit ground reference via the second switch 114.

The primary circuit 102 may include first and second clamping diodes 192, 194 coupled across the resonant circuit 180 to prevent the driver from going into capacitive mode switching when in a transient open load mode. A cathode of the first clamping diode is coupled to the DC input bus 120. The anode of the first clamping diode is coupled to the second terminal of the resonant inductor 182. The cathode of the second clamping diode is coupled to the second terminal of the resonant inductor 182. The anode of the second clamping diode is coupled to the primary circuit ground reference 122.

The output node 186 of the resonant circuit 180 is connected to a first terminal of a DC blocking capacitor 190. A second terminal of the DC blocking capacitor is connected to a first terminal 204 of a primary winding 202 of an output isolation transformer 200. A second terminal 206 of the primary winding of the output isolation transformer is connected to the primary circuit ground reference 122. The foregoing components on the primary circuit 102 of the half-bridge switching circuit 110 operate as a DC to AC inverter to produce an AC voltage across the primary winding of the output isolation transformer.

The output isolation transformer 200 includes a first secondary winding 210 and a second secondary winding 212. The two secondary windings are electrically isolated from the primary winding 202. As illustrated, the primary winding is electrically part of the primary circuit 102, and the secondary windings are electrically part of the secondary circuit 104. The two secondary windings have respective first terminals, which are connected at a center tap 218. Respective second terminals 214, 216 of the first and second secondary windings are connected to input terminals of a half-bridge rectifier 220. The half-bridge rectifier comprises a first rectifier diode 222 and a second rectifier diode 224. The second terminal of the first secondary winding is connected to the anode of the first rectifier diode. The second terminal of the second secondary winding is connected to the anode of the second rectifier diode. The cathodes of the two rectifier diodes are connected together at an output node 226 of the half-bridge rectifier. The center tap of the first and second secondary windings is connected to a secondary circuit ground reference 228. In other embodiments having a single, non-center-tapped secondary winding, the half-bridge rectifier with the two rectifier diodes may be replaced with a full-bridge rectifier with four rectifier diodes.

The output node 226 of the half-bridge rectifier 220 is connected to a first terminal of an output filter capacitor 230. A second terminal of the output filter capacitor is connected to the secondary circuit ground reference 228. An output voltage ($V_{OUT}$) is developed across the output filter capacitor at the output node of the half-bridge rectifier. The output node of the half-bridge rectifier is also connected to a first terminal of a load 240, which may comprise, for example, one or more light-emitting diodes (LEDs) that emit light when sufficient current passes through the LEDs. A second terminal of the load is connected to a current sensing node 242 and to the first terminal of a current sensing resistor 244. A second terminal of the current sensing resistor is connected to the secondary circuit ground reference. When current flows through the load, the same current flows through the current sensing resistor. Accordingly, a voltage develops on the current sensing terminal that has a magnitude with respect to the secondary circuit ground reference that is proportional to the current flowing through the load. In one embodiment, the current sensing resistor has a resistance of, for example, 0.1 ohm such that the effect of the resistance of the current sensing resistor on the load current is insignificant. The output node of the half-bridge rectifier is also connected to a first terminal of a voltage divider circuit 232. The voltage divider circuit includes a first voltage divider resistor 234 coupled in series with a second voltage divider resistor 236 between the output node of the half-bridge rectifier and the secondary circuit ground reference. The voltage divider circuit includes an output node 238 defined between the first and second voltage divider resistors. A voltage across the second resistor is seen at the output node and is representative of the load voltage across the load.

When the driver IC 140 operates to apply alternating drive voltages to the first switch 112 and the second switch 114, an AC voltage develops across the resonant capacitor 184. The voltage across the resonant capacitor may include a DC component; however, the DC blocking capacitor 190 transfers only the AC component of the energy stored in the resonant capacitor to the primary winding 202 of the output isolation transformer 200. The transferred energy is magnetically coupled from the primary winding to the electrically isolated first and second secondary windings 210, 212. The first and second rectifier diodes 222, 224 in the half-bridge rectifier 220 rectify the AC energy from the secondary windings into DC energy, which is provided on the output node 226. The DC energy is stored in the output filter capacitor 230 at a voltage determined by the amount of stored energy. Current from the output filter capacitor is provided to the load 240 at a magnitude determined by the voltage on the half-bridge rectifier output node and the resistance of the load.

Because the intensity of the light emitted by the LEDs in the load 240 is dependent on the magnitude of the current flowing through the LEDs, the current is controlled closely. The current sensing resistor 244 senses the current going through the load and develops a voltage $V_{ISENSE}$ on the current sensing node 242 proportional to the load current. The voltage representing the sensed current is fed back to a current feedback circuit 250 to provide current regulation. The load voltage is to be maintained substantially constant across differing loads. The voltage across the second voltage divider resistor is fed back to a voltage feedback circuit 252 in order to maintain a constant load voltage. In order to control the output power both the load voltage and load current must be controlled.

Outputs from both the current feedback circuit 250 and the voltage feedback circuit 252 are monitored by a frequency control circuit 254 so that the maximum output power can be set to be less than 100 watts. The frequency control circuit integrates both outputs in order to regulate a frequency of the drive IC 140. As mentioned above, if the maximum load current is high, for example, greater than 5 amperes, then sensing the current across the current sensing resistor 244 will be very lossy. Accordingly, a special, high quality and high price, current sensing resistor would need to be used for circuits which produce such a high current. Additionally, integrating the outputs of the current feedback circuit and the voltage feedback circuit can be very complicated, thus adding additional costs to production of the half-bridge resonant type DC-DC converter 100.

Figure 2:
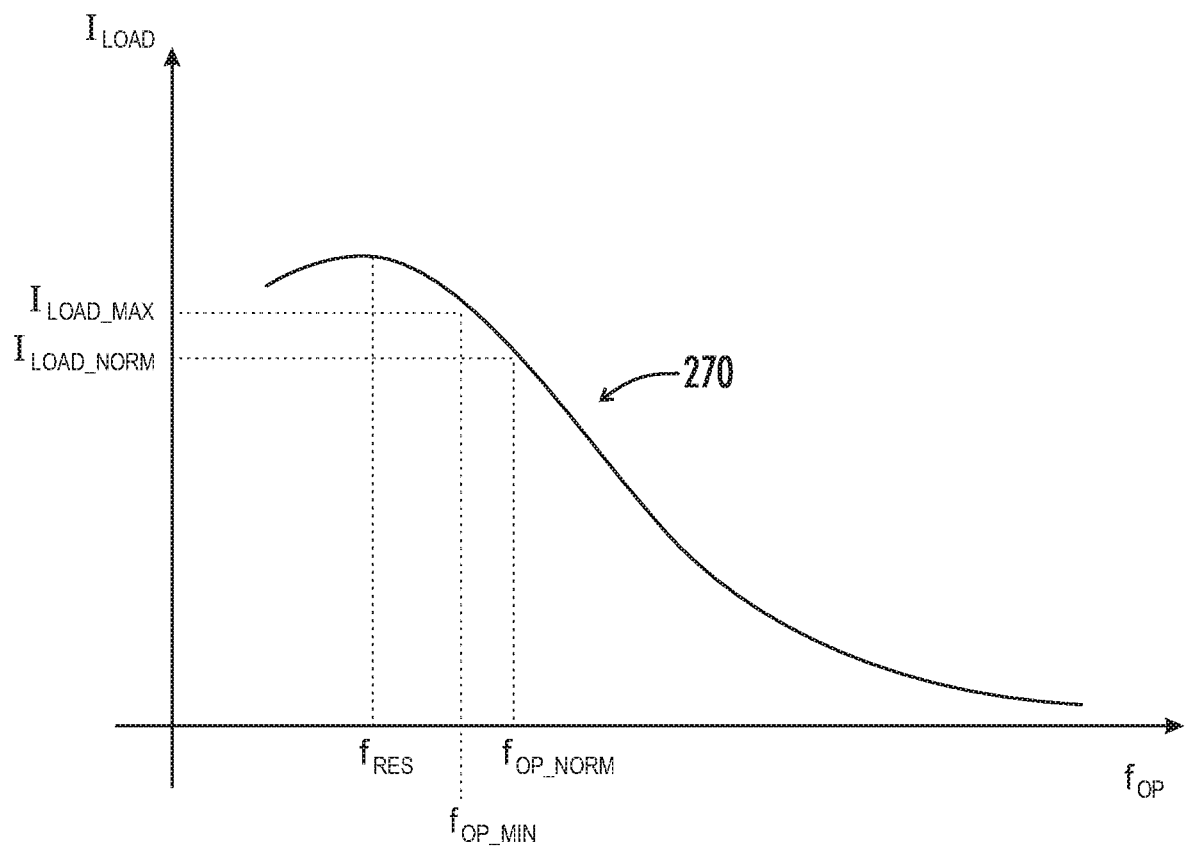
FIG. 2 is a graphical diagram representing an exemplary load current $I_{LOAD}$ versus the operating frequency $f_{OP}$ of the half-bridge resonant type DC-DC converter of FIG. 1.

The relationship of the operating frequency $f_{OP}$ and the current $I_{LOAD}$ through the load 240 for a constant output voltage is illustrated by a graph 270 in FIG. 2, which represents a relationship between the operating frequency $f_{OP}$ and the LED load current $I_{LOAD}$. Normally, the normal operating frequency ($f_{OP\_NORM}$) is above a resonant frequency ($f_{RES}$) of the resonant circuit 180 in order to optimize the half-bridge resonant type DC-DC converter's 100 operation and negative voltage feedback control. The normal operating frequency corresponds to a normal operating current ($I_{LOAD\_NORM}$). The relationship shows that the maximum load current ($I_{LOAD\_MAX}$) corresponds to the minimum operating frequency ($f_{OP\_MIN}$). The minimum operating frequency is greater than the resonant frequency ($f_{OP\_RES}$) of the resonant circuit 180. The operating frequency of the driver IC 140 increases as the load current decreases, and the operating frequency decreases as the load current increases. As a result, if the output voltage is tightly controlled by the voltage feedback circuit and the minimum frequency is pre-set, then the output power will be limited by the minimum operating frequency. Accordingly, if the minimum operating frequency can be accurately set, then the output current and output power can be limited without sensing the output current, as is done in FIG. 1 for the half-bridge resonant type DC-DC converter.

Figure 3:
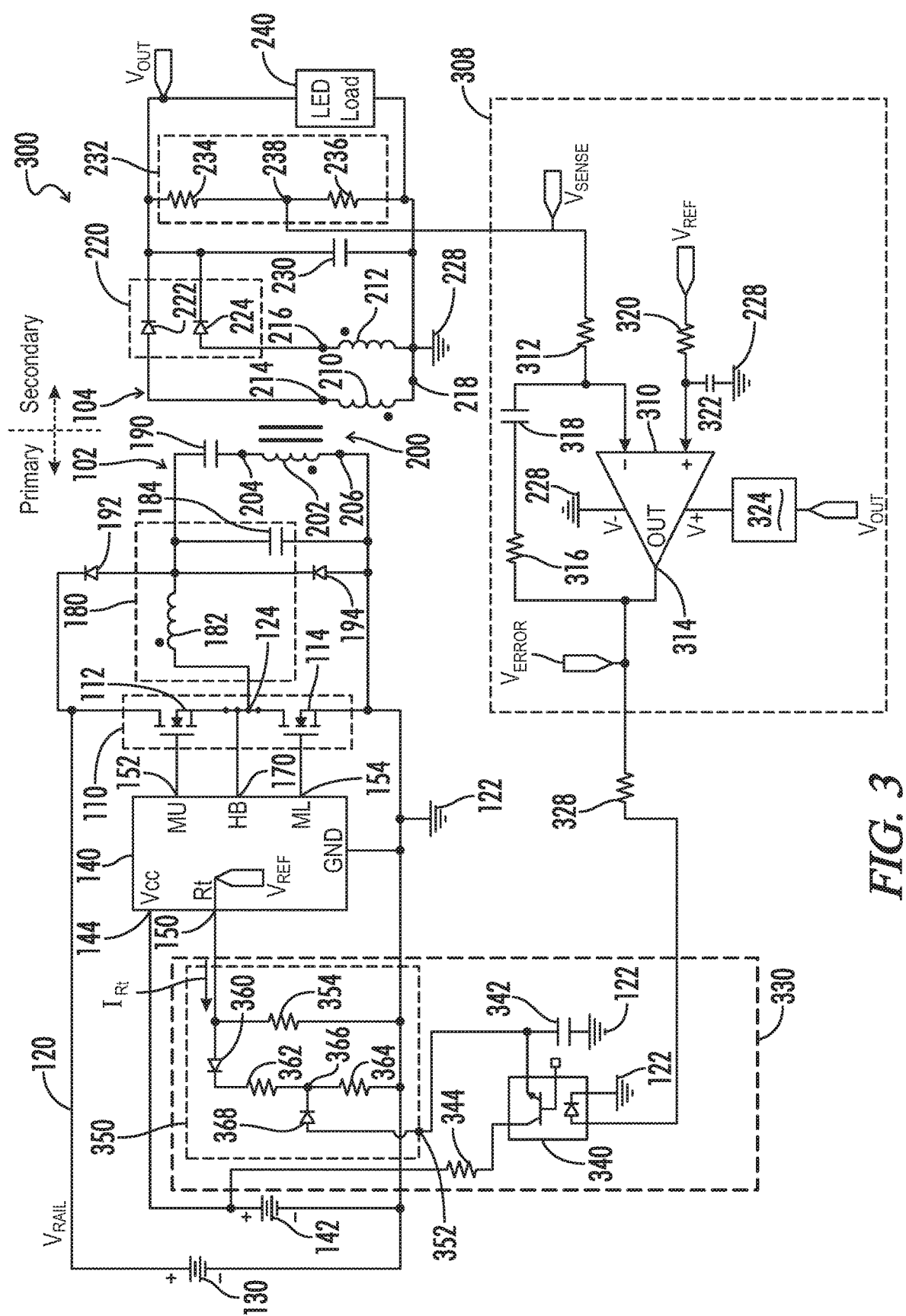
FIG. 3 is a circuit diagram representing another embodiment of a half-bridge type DC-DC converter as disclosed herein.

FIG. 3 illustrates a modified half-bridge resonant type DC-DC converter 300, which eliminates the current sensing resistor 244 and incorporates a revised frequency control method that accurately sets the maximum and minimum operating frequencies of the driver IC 140 in order to limit the output current and output power of the half-bridge resonant type DC-DC converter. The frequency control method also responds to a feedback circuit to adjust the operating frequency in order to maintain a constant pre-set output voltage. As described below, the DC-DC converter of FIG. 3 uses voltage superposition to control the operating frequency $f_{OP}$.

The modified half-bridge resonant type DC-DC converter 300 of FIG. 3 has certain components corresponding to components in the half-bridge resonant type DC-DC converter 100, which operate in the same or similar manner. The corresponding components are identified with the same reference numbers in FIG. 3 as in FIG. 1.

The modified half-bridge resonant type DC-DC converter 300 includes a feedback circuit 308 configured to regulate the output voltage ($V_{OUT}$) at a reference voltage ($V_{REF}$). The reference voltage may also be referred to herein as a reference signal. The second voltage divider resistor 236 senses the voltage across the load 240 and develops a sensor output signal ($V_{SENSE}$) on the output node 238 proportional to the load voltage. The sensor output signal is fed back to a proportional integral (PI) voltage control loop to provide voltage regulation. In FIG. 3, the PI current control loop includes an operational amplifier (OPAMP) 310 having an inverting (−) input terminal, having a non-inverting (+) input terminal, and having an output (OUT) on an output terminal 314. The output node of the voltage divider circuit 232 is connected to the inverting input of the operational amplifier via a series resistor 312. A feedback resistor 316 and a feedback capacitor 318 are connected in series between the output terminal of the operational amplifier and the inverting input. The series resistor and the feedback resistor determine the proportional gain of the PI loop. The series resistor and the feedback capacitor determine the crossover frequency of the PI loop. A reference voltage ($V_{REF}$) is connected to the non-inverting input of the operational amplifier via a buffer resistor 320 and a buffer capacitor 322. The buffer resistor and the buffer capacitor are used to buffer the reference voltage.

The magnitude of the reference voltage is selected to produce a desired load voltage through the load. The reference voltage may be a fixed reference voltage to provide a constant load voltage. As indicated above, the load voltage is maintained constant relative to the reference voltage. If the reference voltage changes to a new magnitude, the load voltage is maintained constant relative to the new magnitude. The operational amplifier is responsive to a difference in the magnitudes of the reference voltage $V_{REF}$ and the sensor output signal $V_{SENSE}$ to generate an error signal $V_{ERROR}$. The error signal is used to control the operational frequency of the driver IC 140 as described below. The operational amplifier may also be considered as a comparator because the operational amplifier compares the magnitudes of the two input signals and generates an output signal having a magnitude responsive to a difference between the magnitudes of the two input signals.

The operational amplifier has a positive power terminal (V+) and a negative power terminal (V−) for powering the operational amplifier. The power at the positive power terminal is provided by the output voltage ($V_{OUT}$) of the half-bridge resonant type DC-DC converter 300 through a voltage regulator 324. The negative power terminal is coupled to the secondary circuit ground reference 228.

During operation of the operational amplifier, when the sensor output signal $V_{SENSE}$ is lower than the reference voltage $V_{REF}$ the error signal $V_{ERROR}$ at the output terminal 314 will increase. When the sensor output signal $V_{SENSE}$ is greater than the reference voltage $V_{REF}$ the error signal $V_{ERROR}$ at the output terminal will decrease. The error signal is fed to a current control circuit 330 to achieve close loop frequency control in order to maintain a constant output voltage when the load 240 changes.

The output terminal 314 of the operational amplifier 310 is connected to the input stage of an optocoupler 340 of the current control circuit 330 via a series resistor 328. The optocoupler may also be referred to as an opto isolator, an optical isolator or an optocoupler. The input stage of the optocoupler has an internal light generation device (e.g., an LED) coupled to the input of the optocoupler. The light generation device is responsive to a voltage applied to the input stage to generate light. The applied voltage is referenced to the secondary circuit ground reference 228 to which the light generation stage is connected. The generated light is propagated internally to a light-responsive base of a phototransistor in an output stage within the same component. The phototransistor has an emitter and a collector. The emitter is connected to the primary circuit ground reference 122 through an optocoupler capacitor 342. The impedance of the phototransistor between the collector and the emitter in the output stage of the optocoupler is responsive to the light generated by the input stage. Thus, the impedance of the output stage is responsive to the voltage applied to the input stage. In the illustrated embodiment, increasing the voltage applied to the input stage decreases the impedance of the output stage, and decreasing the voltage applied to the input stage increases the impedance of the output stage. The optocoupler electrically isolates the secondary circuit voltages and the secondary circuit ground reference in the secondary circuit 104 from the primary circuit voltages and the primary circuit ground reference in the primary circuit 102.

The collector of the phototransistor in the output stage of the optocoupler 340 is connected to the second DC voltage source 142 through an optocoupler resistor (R3) 344.

The emitter of the phototransistor of the output stage of the optocoupler 340 is further connected to an input node 352 of a frequency control block 350 of the current control circuit 330. The frequency control block includes a minimum frequency resistor ($R_{MIN}$) 354 coupled between the timing terminal (RT) 150 of the driver IC 140 and the primary circuit ground reference 122. The frequency control block further includes a first diode (D1) 360, a first maximum frequency resistor (R1) 362, and a second maximum frequency resistor (R2) 364. An anode of the first diode is coupled to the timing terminal (RT) of the driver IC. The first and second maximum frequency resistors are coupled in series between a cathode of the first diode and the primary circuit ground reference. A node 366 defined between the first and second maximum frequency resistors is coupled to a cathode of a second diode 368 of the frequency control block. An anode of the second diode is coupled to the input node of the frequency control block.

The current control circuit 330 receives the error signal $V_{ERROR}$ and adjusts the operating frequency of the driver IC 140. The frequency control driver IC is directly proportional to the current that flows out the timing terminal (Rt) 150 of the driver IC. The frequency follows the equation:

$$f_{OP} = I_{Rt} \cdot 250 \, (\text{KHz/mA}) = \frac{V_{REF}}{R_t} \cdot 250 \, (\text{KHz/mA}) \quad (1)$$

$R_t$ is the total resistance connected to the timing terminal (Rt).

The total current ($I_{Rt}$) flowing out of the timing terminal (Rt) can be expressed as:

$$I_{Rt} = I_{R_{min}} + I_{D1} = \frac{V_{REF}}{R_{min}} + \frac{V_{REF} - V_2}{R_1} \quad (2)$$

The voltage ($V_{R2}$) across the second maximum frequency resistor (R2) 364 can be expressed as by applying the superposition principle:

$$V_{R2} = V_{REF} \cdot \frac{R_2}{R_1 + R_2} + V_{cc} \cdot \frac{R_2}{R_3 + R_{OPTO}(V_{ERROR}) + R_2} \quad (3)$$

The OPTO emitter resistance, $R_{OPTO}$, is a function of $V_{ERROR}$.

$$R_{OPTO}(V_{ERROR}) = K \cdot \frac{R_{OPTO\_MAX}}{V_{ERROR}} \quad (4)$$

K is a gain constant. $R_{OPTO\_MAX}$ is a constant.
Substituting $V_{R2}$ with equations (3) and (4) can be expressed as:

$$I_{Rt} = \frac{V_{REF}}{R_{min}} + \frac{V_{REF}}{R_1 + R_2} - \frac{V_{cc}}{R1} \cdot \frac{R_2}{R_3 + K \cdot \frac{R_{OPTO\_MAX}}{V_{ERROR}} + R_2} \quad (5)$$

The last item on the right-hand side of equation (5) can be defined as an offset current $I_{OFFSET}$:

$$I_{OFFSET} = \frac{V_{cc}}{R1} \cdot \frac{R_2}{R_3 + K \cdot \frac{R_{OPTO\_MAX}}{V_{ERROR}} + R_2} \quad (6)$$

The offset current $I_{OFFSET}$ is the controlling current from the OPTO, which adds to the total current $I_{Rt}$ at the timing terminal (Rt) 150 of the driver IC 140.

From equation (2) we can see that the minimum current at the timing terminal (Rt) happens when the current $I_{D1}$ through the first diode (D₁) 360 is zero (e.g., when the first diode D1 is reverse-biased or not conducting).

From equation (5) we can see that the maximum current at the timing terminal (Rt) happens when the offset current $I_{OFFSET}$ is zero (e.g., when the second diode (D₂) 368 is reverse-biased or not conducting).

Before the feedback circuit 308 starts working, the error signal $V_{ERROR}$ is zero. Accordingly, the second diode (D₂) 368 doesn't conduct any current and the emitter of the optocoupler 340 is open. As a result, there is no voltage across the optocoupler capacitor 342 which causes the second diode (D₂) to be negatively biased and thus not conduct any current. This is when the maximum frequency of the driver IC 140 happens.

If the error voltage $V_{ERROR}$ is too high, it will drive too much current through the second diode (D₂) 368. This will in turn saturate the emitter of the optocoupler 340 and will force the emitter resistance to be very close to zero. As a result, there will be a large voltage across the second maximum frequency resistor (R2) 364. If the voltage across the second maximum frequency resistor is greater than the reference voltage $V_{REF}$, for example $V_{REF}$ may equal 3.5 volts, then the first diode (D1) 360 will stop conducting current. This is when the minimum frequency of the driver IC 140 happens.

The minimum operating frequency $f_{min}$ when the reference voltage $V_{REF}$ is equal to 3.5 volts can be defined based on the discussion above as follows:

$$f_{min} = \frac{3.5}{R_{min}} \cdot 250 \text{ (KHz/mA)} \qquad (7)$$

The maximum operating frequency $f_{max}$ when the reference voltage $V_{REF}$ is equal to 3.5 volts can be defined based on the discussion above as follows:

$$f_{max} = \frac{3.5}{\frac{R_{min} \cdot (R_1 + R_2)}{R_{min} + (R_1 + R_2)}} \cdot 250 \text{ (KHz/mA)} \qquad (8)$$

Figure 4:
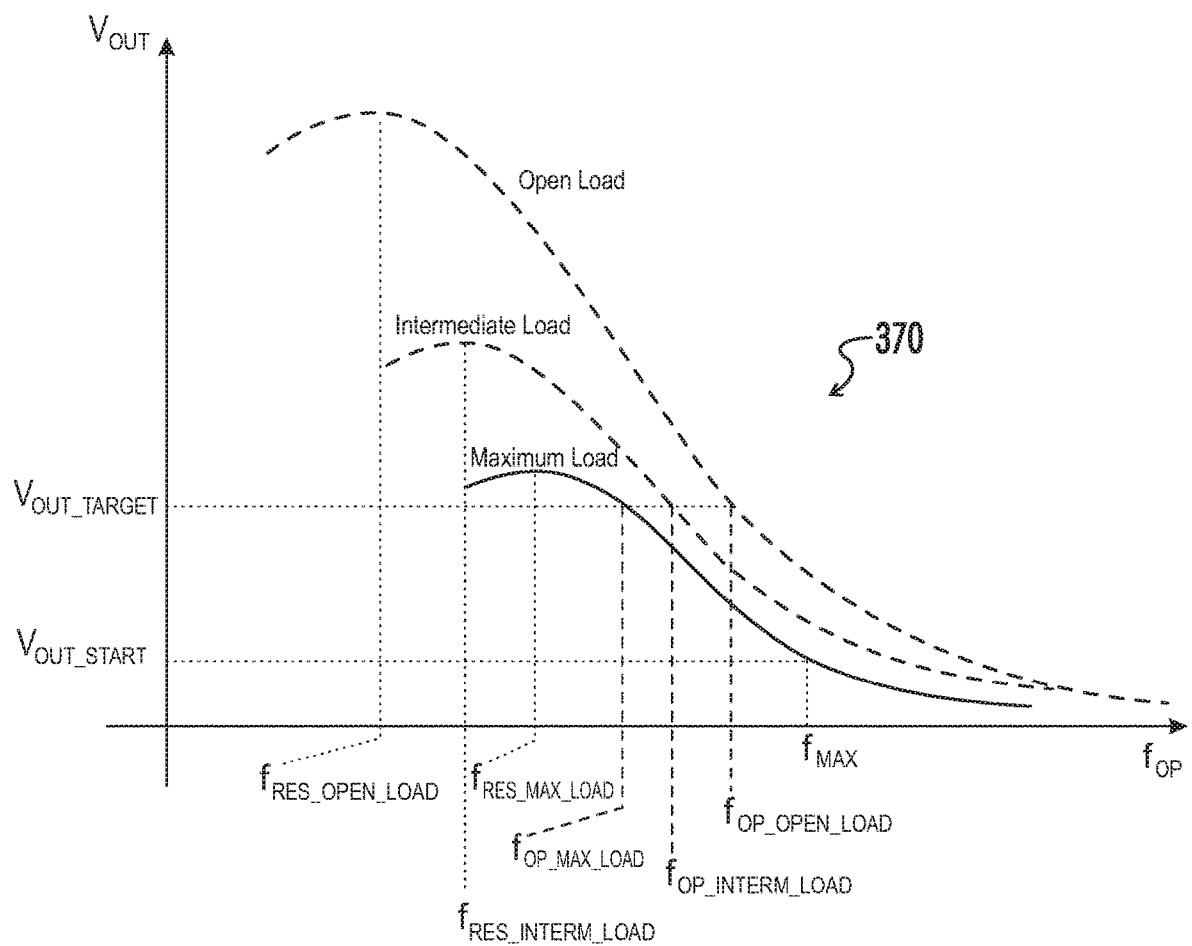
FIG. 4 is a graphical diagram representing an exemplary load voltage $V_{LOAD}$ versus the operating frequency $f_{OP}$ of the modified half-bridge resonant type DC-DC converter of FIG. 1 for three different loads including an open load, an intermediate load, and a maximum load.

The relationship of the operating frequency $f_{OP}$ and the output voltage $V_{OUT}$ through the load 240 for three load curves (e.g., open load, intermediate load, and maximum load) associated with the modified half-bridge resonant type DC-DC converter 300 is illustrated by graph 370 in FIG. 4, which represents a relationship between the operating frequency $f_{OP}$ and the output voltage $V_{OUT}$ across the load 240. The self-resonant frequency decreases when the load resistance decreases. For example, as illustrated in FIG. 4, the maximum load self-resonant frequency $f_{RES\_MAX\_LOAD}$ is greater than the intermediate load self-resonant frequency $f_{RES\_INTERM\_LOAD}$ is greater than the open load self-resonant frequency $f_{RES\_OPEN\_LOAD}$ (e.g., $f_{RES\_MAX\_LOAD} > f_{RES\_INTERM\_LOAD} > f_{RES\_OPEN\_LOAD}$). The steady state operating frequency for each load is less than the related self-resonant frequency. The steady state operating frequency of the maximum load is the lowest steady state operating frequency among the respective loads. When load reduces (or output resistance decreases) the operating frequency will increase. The steady state operating frequency of the open load is the highest steady state operating frequency among the respective loads. When load changes the operating frequency will change between the maximum load operating frequency $f_{OP\_MAX\_LOAD}$ and the open load operating frequency $f_{OP\_OPEN\_LOAD}$ to maintain a target output voltage $V_{OUT\_TARGET}$. The intermediate load operating frequency $f_{OP\_INTERM\_LOAD}$ for the target output voltage VOGT TARGET is between the maximum load operating frequency $f_{OP\_MAX\_LOAD}$ and the open load operating frequency $f_{OP\_OPEN\_LOAD}$.

By rewriting equation (5), the control of current control circuit 330 by the voltage-controlled feedback circuit 308 can be more easily realized.

$$I_{Rt} = \frac{V_{REF}}{R_{min}} + \frac{V_{REF}}{R_1 + R_2} - \frac{V_{cc}}{R1} \cdot \frac{R_2}{R_3 + K \cdot \frac{R_{OPTO\_MAX}}{V_{ERROR}} + R_2} = \qquad (9)$$

$$\frac{V_{REF}}{R_{min}} + \frac{V_{REF}}{R_1 + R_2} - I_{OFFSET}$$

Based on equation (9) and FIG. 4, if a load change causes the output voltage $V_{OUT}$ to be less than the reference voltage $V_{REF}$, then the error voltage $V_{ERROR}$ will increase, which causes the offset current $I_{OFFSET}$ to increase, which in turn causes the timing current $I_{Rt}$ flowing out of the timing terminal ($R_t$) 150 of the driver IC 140 to decrease, and as a result the operating frequency $f_{OP}$ decreases (according to equation (1)) and the output voltage $V_{OUT}$ in turn is caused to increase.

Additionally, based on equation (9) and FIG. 4, if a load change causes the output voltage $V_{OUT}$ to be greater than the reference voltage $V_{REF}$, then the error voltage $V_{ERROR}$ will decrease, which causes the offset current $I_{OFFSET}$ to decrease, which in turn causes the timing current $I_{Rt}$ flowing out of the timing terminal ($R_t$) 150 of the driver IC 140 to increase, and as a result the operating frequency $f_{OP}$ increases (according to (1)) and the output voltage $V_{OUT}$ in turn is caused to decrease.

The following are guidelines which may aid in the determination and setup of the maximum frequency $f_{max}$ (or startup frequency). At initial turn on, the driver IC 140 of the modified half-bridge resonant type DC-DC converter 300 will work at the maximum operating frequency $f_{max}$. As illustrated in FIG. 4, the maximum operating frequency $f_{max}$ corresponds to the start-up voltage $V_{OUT\_START}$. In order to keep the operational amplifier 310 of the feedback circuit 308 working initial startup, the start-up voltage $V_{OUT\_START}$ needs to be greater than the operational amplifier minimum supply voltage $V_{OPAMP\_MIN}$ at maximum load:

$$V_{OUT\_START}@f_{max} > V_{OPAMP\_MIN} \qquad (10)$$

The maximum operating frequency $f_{max}$ should be greater than the open load operating frequency $f_{OP\_OPEN\_LOAD}$. At the open load condition, the driver IC 140 works at the open load operating frequency $f_{OP\_OPEN\_LOAD}$ to maintain the target output voltage $V_{OUT\_TARGET}$. If the maximum operating frequency $f_{max}$ is set to be less than the open load operating frequency $f_{OP\_OPEN\_LOAD}$, then the output voltage $V_{OUT}$ will always be greater than the target output voltage $V_{OUT\_TARGET}$ and the modified half-bridge resonant type DC-DC converter 300 will be uncontrollable. Accordingly, the maximum frequency limit should to be set between the open load operating frequency $f_{OP\_OPEN\_LOAD}$ and the maximum operating frequency $f_{max}$.

The following are guidelines which may aid in the determination and setup of the minimum frequency $f_{min}$ (or power clamping frequency). The maximum power output of the modified half-bridge resonant type DC-DC converter 300 is determined by the minimum frequency $f_{min}$ as shown in FIG. 2. When the load 240 steadily decreases, the feedback circuit 308 and the current control circuit 330 will have to reduce the operating frequency $f_{OP}$ in order to increase the output current $I_{LOAD}$ and keep the output voltage $V_{OUT}$ constant. If, however, the operating frequency is clamped at the minimum frequency $f_{min}$, then the output voltage $V_{OUT}$ will be lower than the reference voltage $V_{REF}$. As a result, the feedback circuit 308 error voltage $V_{ERROR}$ will be saturated at the maximum output of operational amplifier 310 and will remain as such. Accordingly, the minimum frequency $f_{min}$ may be set by carefully setting the minimum frequency resistor $R_{min}$ such that the maximum power output of the modified half-bridge resonant type DC-DC converter 300 can be clamped at a certain acceptable level that will meet UL requirement (e.g., 100 watts).

To facilitate the understanding of the embodiments described herein, a number of terms are defined below. The terms defined herein have meanings as commonly understood by a person of ordinary skill in the areas relevant to the present invention. Terms such as "a," "an," and "the" are not intended to refer to only a singular entity, but rather include the general class of which a specific example may be used for illustration. The terminology herein is used to describe specific embodiments of the invention, but their usage does not delimit the invention, except as set forth in the claims. The phrase "in one embodiment," as used herein does not necessarily refer to the same embodiment, although it may.

The term "circuit" means at least either a single component or a multiplicity of components, either active and/or passive, that are coupled together to provide a desired function. Terms such as "wire," "wiring," "line," "signal," "conductor," and "bus" may be used to refer to any known structure, construction, arrangement, technique, method and/or process for physically transferring a signal from one point in a circuit to another. Also, unless indicated otherwise from the context of its use herein, the terms "known," "fixed," "given," "certain" and "predetermined" generally refer to a value, quantity, parameter, constraint, condition, state, process, procedure, method, practice, or combination thereof that is, in theory, variable, but is typically set in advance and not varied thereafter when in use.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The previous detailed description has been provided for the purposes of illustration and description. Thus, although there have been described particular embodiments of a new and useful invention, it is not intended that such references be construed as limitations upon the scope of this invention except as set forth in the following claims.

What is claimed is:

1. A resonant power converter, comprising:
   first and second switching elements coupled across a direct current (DC) power source;
   a resonant circuit coupled between an isolation transformer primary winding and an output node between the first and second switching elements;
   a voltage sensing circuit coupled to a secondary winding of the isolation transformer and configured to provide a sensor output signal representative of an output voltage across a load; and
   a feedback circuit configured to generate an error signal responsive to a difference between the sensor output signal and a reference signal;
   a controller comprising a frequency control input terminal, the controller configured to generate drive signals to the first and second switching elements at a determined operating frequency; and
   a current control circuit coupled between the feedback circuit and the frequency control input terminal of the controller, and configured to
      apply a first resistance between the frequency control input terminal and a primary side ground, thereby defining a minimum operating frequency associated with a maximum output current to the load, and
      apply a second resistance between the frequency control input terminal and the primary side ground, the combination of the first resistance and the second resistance thereby defining a maximum operating frequency associated with a minimum output current to the load,
   wherein the controller is configured to regulate the operating frequency of the first and second switching elements between the minimum and maximum operating frequencies based at least on the error signal.

2. The resonant power converter of claim 1, wherein:
   the minimum operating frequency is greater than a resonant frequency of the resonant power converter.

3. The resonant power converter of claim 1, wherein:
   the second resistance includes a first diode having an anode of the first diode coupled to the frequency control input terminal; and
   the second resistance further includes first and second resistors coupled in series between a cathode of the first diode and the primary side ground.

4. The resonant power converter of claim 3, wherein:
   the minimum operating frequency is defined when the first diode is reverse biased.

5. The resonant power converter of claim 3, wherein the current control circuit includes:
   an optocoupler having an input stage and an output stage, the input stage coupled to receive the error signal, the output stage having a variable impedance between a first output terminal and a second output terminal responsive to the error signal; and
   a second diode coupled between the second output terminal and a node defined between the first and second resistors of the second resistance.

6. The resonant power converter of claim 5, wherein:
   the maximum operating frequency is defined when the second diode is reverse biased.

7. The resonant power converter of claim 1, wherein:
   the error signal of the feedback circuit increases when the sensor output signal is greater than the reference signal; and
   the error signal of the feedback circuit decreases when the sensor output signal is less than the reference signal.

8. The resonant power converter of claim 1, wherein:
   the controller adjusts the operating frequency of the first and second switching elements for maintaining a substantially constant output voltage across the load when a resistance of the load changes.

9. The resonant power converter of claim 1, wherein:
   the operating frequency of the controller is directly proportional to a current output of the frequency control input terminal; and
   the frequency control input terminal is coupled to the reference signal.

10. A method of controlling an output power of a resonant power converter having a substantially constant output voltage, the method comprising:
    sensing a voltage signal across a load of the resonant power converter;
    generating a feedback error signal based at least on the voltage signal relative to a reference voltage;
    determining an operating frequency of the resonant power converter based at least on the feedback error signal;
    setting a minimum operating frequency of the resonant power converter based at least in part on a first current signal at a frequency control pin of a controller of the resonant power converter; and
    regulating the operating frequency of the resonant power converter above the set minimum operating frequency based on a current at the frequency control pin.

11. The method of claim 10, further comprising:
    setting the minimum operating frequency greater than a resonant frequency of the resonant power converter.

12. The method of claim 10, further comprising:
    controlling an output current of the resonant power converter based on the operating frequency.

13. The method of claim 10, further comprising:
defining the first current signal based on a first resistance coupled between the frequency control pin and a primary side ground.

14. The method of claim 10, further comprising:
setting a maximum operating frequency of the resonant power converter based at least in part on a second current signal at the frequency control pin of the controller; and
regulating the operating frequency of the resonant power converter between the set minimum operating frequency and the set maximum operating frequency based on a combination of the first and second current signals at the frequency control pin.

15. The method of claim 14, further comprising:
defining the first current signal based on a first resistance coupled between the frequency control pin and a primary side ground; and
defining the second current signal based on a second resistance coupled between the frequency control pin and the primary side ground, the second resistance coupled in parallel with the first resistance.

* * * * *